United States Patent [19]
Alberino et al.

[11] 4,342,841
[45] Aug. 3, 1982

[54] POLYAMIDE POLYURETHANE PREPARED BY REACTION OF POLYISOCYANATE WITH A 1,1-DIAMINO ETHYLENE

[75] Inventors: Louis M. Alberino, Cheshire; Dale F. Regelman, Wallingford, both of Conn.

[73] Assignee: The Upjohn Company, Kalamazoo, Mich.

[21] Appl. No.: 292,871

[22] Filed: Aug. 14, 1981

[51] Int. Cl.³ .............................................. C08G 18/14
[52] U.S. Cl. .................................. 521/163; 521/129; 528/53; 528/73; 528/75
[58] Field of Search ................. 521/163, 129; 528/53, 528/73, 75

[56] References Cited
U.S. PATENT DOCUMENTS 2,948,691  8/1960  Windemuth et al. ............... 521/174
4,218,543  8/1980  Weber et al. ......................... 521/51

OTHER PUBLICATIONS

Polyurethane Chemistry and Technology, Part II by J. H. Saunders and K. C. Frisch, Chapter IX, 1964, Interscience Publishers, New York, N.Y.
Journal of Organic Chem., 29, 2932 (1964), D. H. Clemens et al.

Primary Examiner—Maurice J. Welsh
Attorney, Agent, or Firm—James S. Rose; Denis A. Firth

[57] ABSTRACT

Polyamide polyurethane polymers are disclosed that are derived from the reaction of (A) an organic polyisocyanate; (B) at least one organic polyol; and (C) a ketene-aminal having the formula

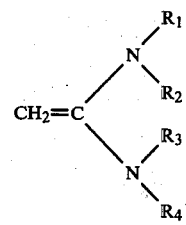

wherein $R_1$, $R_2$, $R_3$, and $R_4$, when taken separately, are independently selected from the group consisting of lower alkyl, aralkyl, and cycloalkyl and, when taken together as $R_1$ with $R_2$ and $R_3$ with $R_4$ with the respective nitrogen atoms to which they are attached, represent independently heterocyclic groups having from 5 to 7 ring atoms, wherein the equivalent proportions of said polyol component (B) to said ketene-aminal component (C) fall within the range of about 1:4 to about 1:80 and the ratio of equivalents of said isocyanate to total equivalents of isocyanate reactive ingredients (B) plus (C) is within the range of about 0.95:1 to 6:1.

The polymers find particular utility in the preparation of RIM parts which parts have essentially attained their optimum physical properties without the need of a thermal curing step.

18 Claims, No Drawings

POLYAMIDE POLYURETHANE PREPARED BY REACTION OF POLYISOCYANATE WITH A 1,1-DIAMINO ETHYLENE

BACKGROUND OF THE INVENTION

1. Field of the Invention

This invention relates to polyamide polyurethane polymers and is more particularly concerned with novel polyamide polyurethanes having a ketene-aminal as a recurring unit in the polymer network and the novel preparation of said polymers.

2. Description of the Prior Art

Polyurethane polymers and elastomers prepared from high molecular weight polyols and organic polyisocyanates and chain extended with low molecular weight polyols or polyamines have been known in the art for a long time; see U.S. Pat. No. 2,948,691, and Polyurethane Chemistry and Technology, Part II by J. H. Saunders and K. C. Frisch, Chapter IX, 1964, Interscience Publishers, New York, N.Y. for typical background art.

Polyurethane polymer properties have been varied in numerous ways by adjusting such parameters as reactant functionality, type of isocyanate or polyol, and, very importantly, by adjusting the amount and the type of extender employed. In some applications, particularly with the advent of very fast molding techniques such as the reaction injection molding (RIM) method, there is a need for very fast polymerization systems. However, more than just rapid polymerizations must be considered because other important factors are involved such as the amount of post cure treatment a molded sample requires to reach optimum physical properties, and, of course, the ultimate physical properties themselves. Generally speaking, the use of greater levels of, or, more active, polyurethane catalysts is not the answer. In fact, this latter approach usually results in adverse effects. In certain applications, a particularly important property is the amount of heat a molded sample can withstand before it will distort or begin to lose its molded configuration. This property is particularly important when molded automotive parts such as panels, doors, lids, fenders, etc. are exposed to high temperature paint drying ovens.

U.S. Pat. No. 4,218,543 has disclosed certain extender modifications (i.e. the use of specific active aromatic diamines) as one means of achieving a rapid urethane (RIM) process. The properties of the molded articles produced according to this method are good, including sufficient high temperature resistance to withstand paint oven-drying conditions. However, this method usually requires a post cure treatment of the molded polyurethanes at elevated temperatures in order for them to achieve their optimum operating physical property levels.

Surprisingly, we have now discovered that by employing a certain class of ketene-aminals as chain extenders that all of the above requirements can be met. Extremely rapidly reacting polyurethane polymers are obtained which are particularly suited to RIM methods of preparation. The ketene-aminals form amide linkages by direct reaction with the polyisocyanate component. Although polyamide linkages are formed in the polyurethane system according to the present invention, no volatile products are formed such as water, hydrohalic acids, carbon dioxide, or other volatile products which are produced in prior art methods for preparing polyamides, and which, if produced, would seriously interfere in any reaction molding process.

Unexpectedly, this provides the fastest and easiest means for forming polyamide linkages in conjunction with polyurethane linkages. At the same time, the advantageous physical properties such as good tensile and impact strengths, enjoyed by polyamides, are imparted to the polyamide polyurethanes in accordance with the present invention.

The degree of heat resistance of the polymers in accordance with the present invention can be easily controlled by the isocyanate index employed. That is to say, when a certain ratio of NCO to NCO reactive ingredients is exceeded and an isocyanate trimerization catalyst is present then polyisocyanurate linkages are incorporated into the polyamide polyurethane which gives rise to greater polymer heat resistance.

Most surprising and unexpected is the fact that the present polymers, notwithstanding their very high rate of formation, can be obtained in most cases in the as-molded form with their physical properties essentially at their optimum levels without the need of a post cure heat treatment.

Additionally, the molded samples have excellent "green strengths" which facilitate the demolding of complicated configurations, particularly those configurations with undercuts.

SUMMARY OF THE INVENTION

This invention comprises polyamide polyurethanes which comprise the product of reaction of A. an organic polyisocyanate;
B. at least one organic polyol; and
C. a ketene-aminal having the formula

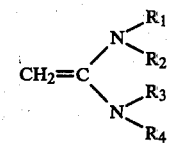

wherein $R_1$, $R_2$, $R_3$, and $R_4$ when taken separately are independently selected from the group consisting of lower-alkyl, aralkyl, and cycloalkyl and, when taken together as $R_1$ with $R_2$ and $R_3$ with $R_4$ with the respective nitrogen atoms to which they are attached, represent independently a heterocyclic group having from 5 to 7 ring atoms wherein the equivalent proportions of said polyol component (B) to said ketene-aminal component (C) fall within the range of about 1:4 to about 1:80 and the ratio of equivalents of said isocyanate to total equivalents of isocyanate reactive ingredients (B) plus (C) is within the range of about 0.95:1 to 6:1.

The invention also comprises the process of preparing said polyamide polyurethanes.

The invention also comprises the polyamide polyurethanes defined above and prepared by the reaction injection molding (RIM) method.

The term "lower alkyl" means alkyl having from 1 to 8 carbon atoms, inclusive, such as methyl, ethyl, propyl, butyl, pentyl, hexyl, heptyl, octyl, and isomeric forms thereof.

The term "aralkyl" means moieties having from 7 to 12 carbon atoms, inclusive, such as benzyl, phenethyl, phenylpropyl, benzhydryl, naphthylmethyl, and the like.

The term "cycloalkyl" means moieties having from 4 to 8 carbon atoms, inclusive, such as cyclobutyl, cyclopentyl, cyclohexyl, cycloheptyl, cyclooctyl, and the like.

The term "heterocyclic group having from 5 to 7 ring atoms" means a heterocyclic radical containing at least the basic valence ring nitrogen and optionally contains one or more additional hetero atoms such as nitrogen, oxygen and sulfur. Illustrative of heterocyclic groups are N-pyrrolidinyl, N-oxazolidinyl, N-thiazolidinyl, N-piperidinyl, N-(4-methylpiperidinyl), N-morpholinyl, N-(4-methylpiperazinyl), N-(4-ethylpiperazinyl), N-hexahydroazepinyl, and the like.

DETAILED DESCRIPTION OF THE INVENTION

The advantageous features and properties of the polymers in accordance with this invention and the facility with which said polymers are formed are a direct result of the facile reaction of the ketene-aminal (I) with the isocyanate reactant (A) in combination with the polyurethane forming reaction to form polyamide polyurethanes.

Conveniently, the ketene-aminal behaves as a difunctional ingredient wherein the methylene carbon is capable of reacting with two isocyanate groups in forming two amide linkages shown schematically as follows

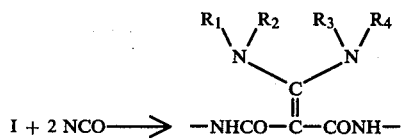

I + 2 NCO ——→ —NHCO—C—CONH—

That is to say, the equivalent weight of (I) is half the molecular weight.

The ketene-aminals (I) defined above are, for the most part, known in the art and are readily prepared (see D. H. Clemens et al, J. Org. Chem. 29, 2932 [1964] and references cited therein) by reacting either ketene acetals, alkoxyacetylenes, or, preferably, ethyl orthoacetate with an excess of the secondary amine (or amines) corresponding to $HNR_1R_2$ and/or $HNR_3R_4$ in the presence of an acid acceptor. A typical reaction is as follows:

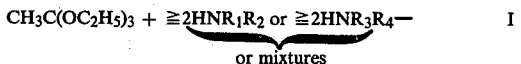

Preferred amongst the classes of (I) defined above are those wherein $R_1$, $R_2$, $R_3$, and $R_4$ are all the same and are lower alkyl defined above and those wherein $R_1$ and $R_2$, and $R_3$ and $R_4$ when taken together with their respective nitrogen atoms form the same heterocyclic group having from 5 to 7 ring atoms defined above. The most preferred class comprises the latter nitrogen heterocycles.

Illustrative but not limiting of the ketene-aminals are 1,1-bis(dimethylamino)ethylene, 1,1-bis(diethylamino)ethylene, 1,1-bis(dibutylamino)ethylene, 1,1-bis(dihexylamino)ethylene, 1,1-bis(dioctylamino)ethylene, 1-dimethylamino-1-diethylaminoethylene, 1,1-bis(diisopropylamino)ethylene, 1,1-bis(diisobutylamino)ethylene, and the like; 1,1-bis(dibenzylamino)ethylene, 1,1-bis(diphenethylamino)ethylene, 1,1-bis(dinaphthylmethylamino)ethylene, and the like; 1,1-bis(dicyclobutylamino)ethylene, 1,1-bis(dicyclopentylamino)ethylene, 1,1-bis(dicyclohexylamino)ethylene, 1,1-bis(dicycloheptylamino)ethylene, 1,1-bis(dicyclooctylamino)ethylene, 1-dicyclobutylamino-1-dicyclohexylaminoethylene, and the like; 1,1-bis(N-pyrrolidinyl)ethylene, 1,1-bis(N-oxazolidinyl)ethylene, 1,1-bis(N-thiazolidinyl)ethylene, 1,1-bis(N-piperidinyl)ethylene, 1,1-bis[N-(4-methylpiperidinyl)]ethylene, 1,1-bis(N-morpholinyl)ethylene, 1,1-bis[N-(4-methylpiperazinyl)]ethylene, 1,1-bis[N-(4-ethylpiperazinyl)]ethylene, 1-N-piperidinyl-1-N-morpholinoethylene, 1,1-bis(N-hexahydroazepinyl)ethylene, and the like.

Preferred ketene-aminals are 1,1-bis(dimethylamino)ethylene, 1,1-bis(diethylamino)ethylene, 1,1-bis(dipropylamino)ethylene, 1,1-bis(dibutylamino)ethylene, 1,1-bis(dipentylamino)ethylene, 1,1-bis(dihexylamino)ethylene, 1,1-bis(diheptylamino)ethylene, 1,1-bis(dioctylamino)ethylene, 1,1-bis(N-pyrrolidinyl)ethylene, 1,1-bis(N-piperidinyl)ethylene, and 1,1-bis(N-morpholinyl)ethylene.

Most preferred species are the latter three heterocyclic ketene-aminals.

The polyisocyanates (A) to be used in accordance with the present invention can be any of the organic di- or higher functionality polyisocyanates known to those skilled in the polyurethane art and may be aliphatic cycloaliphatic, aromatic, or heterocyclic polyisocyanates such as those described by Siefken in Justus Liebigs Annalen der Chemie, 562, pages 75 to 136.

The preferred class of polyisocyanates is the aromatic polyisocyanates and the preferred isocyanate functionality is about 2. Most preferably, the polyisocyanates are aromatic isocyanates that are essentially diisocyanates which are in the liquid state at room temperature (circa 20° C.).

Typical of the polyisocyanates which can be used are hexamethylene diisocyanate, cyclohexane-1,4-diisocyanate, 3,3,5-trimethyl-5-isocyanatomethylcyclohexyl isocyanate, 4,4'-methylenebis(cyclohexyl isocyanate), 4,4'-methylenebis(phenyl isocyanate), 2,4'-methylenebis(phenyl isocyanate), m- and p-phenylene diisocyanate, 2,4- and 2,6-toluene diisocyanate and the mixtures of these two isomers, triphenylmethane triisocyanates, 4,4'-diisocyanatodiphenyl ether; the various types of liquefied methylenebis(phenyl isocyanates) obtained by reacting methylenebis(phenyl isocyanate) in varying proportions with minor amounts of one or more glycols as typically disclosed in U.S. Pat. Nos. 3,384,653; 3,394,164; 3,394,165; 3,644,457; 3,883,571; 4,031,026; 4,115,429; 4,118,411 and 4,229,347; a liquid prepolymer composition comprising the product obtained by bringing together a polymethylene polyphenylisocyanate containing from about 65 to about 85 percent by weight of methylenebis(phenyl isocyanate), the remainder of said polymethylene polyphenylisocyanates having a functionality greater than 2 and from about 0.0185 to about 0.15 equivalent, per equivalent of said polyphenylisocyanate of a polyoxyethyleneglycol having an average molecular weight from about 200 to about 600 in accordance with U.S. Pat. No. 4,055,548; and the polymethylene polyphenyl polyisocyanates which are mixtures containing from about 20 to about 90 percent by weight of methylenebis(phenyl isocyanate) the remainder of the mixture being polymethylene polyphenyl polyisocyanates of functionality higher than 2.0. Such polyisocyanates and methods for their preparation are well known in the art; see, for example, U.S. Pat. Nos. 2,683,730, 2,950,263, 3,012,008 and 3,097,191.

These polyisocyanates are also available in various modified forms. One such form comprises a polymethylene polyphenyl polyisocyanate as above which has been subjected to heat treatment, generally at temperatures from about 150° C. to about 300° C., until the viscosity (at 25° C.) has been increased to a value within the range of about 800 to 1500 centipoises. Another modified polymethylene polyphenyl polyisocyanate is one which has been treated with minor amounts of an epoxide to reduce the acidity thereof in accordance with U.S. Pat. No. 3,793,362.

Particularly preferred are the liquid diisocyanates comprising the carbodiimide-containing methylenebis(phenyl isocyanates) having an isocyanate equivalent weight of from about 130 to about 180 in accordance with U.S. Pat. No. 3,384,653, and the liquid diisocyanates obtained from 4,4'-methylenebis(phenyl isocyanate) with mixtures of dipropylene glycol and tripropylene glycol.

Also included within the scope of the organic polyisocyanates to be used in accordance with the present invention are the isocyanate-terminated polyurethane prepolymers prepared from any of the typical polyisocyanates disclosed above and any of the typical polyols disclosed below in any proportions wherein the equivalents of the starting polyisocyanate are in excess over the polyol equivalents.

The organic polyol component (B) can be any of the polyols well known to those skilled in the art as being useful for the preparation of polyurethane polymers. Primarily, the choice of polyol functionality and molecular weight will depend on the specific polymer properties required and the type of polyol employed. Generally speaking, the organic polyol has a primary hydroxyl functionality of from about 2 to about 4 and a molecular weight of from about 1500 to about 8000. The preferred functionality is from about 2 to about 3 and the preferred molecular weight range is from about 2000 to about 7000, with a most preferred range of about 4000 to about 6500. The most preferred functionality is 3.

While the polyol has been defined hereinabove as containing primary hydroxyls this is not to imply that minor amounts of secondary hydroxyl groups cannot be present, either in the same molecule with the primary groups, or in a separate polyol component.

Illustrative, but not limiting, of the classes of polyols which can be used are the polyoxyalkylene polyethers; polyester polyols; polyol adducts derived from ethylene oxide with methylenedianiline and polymethylene polyphenylamine mixtures (in accordance with U.S. Pat. No. 3,499,009); polyols obtained by the Mannich condensation of a phenolic compound with formaldehyde, an alkanolamine, and ethylene oxide (in accordance with U.S. Pat. No. 3,297,597); vinyl reinforced polyether polyols, e.g. polyols obtained by the polymerization of styrene or acrylonitrile in the presence of the polyether; polyacetals prepared from glycols such as diethylene glycol and formaldehyde; polycarbonates, for example those derived from butanediol with diarylcarbonates; polyester amides; the resole polyols (see Prep. Methods of Polymer Chem. by W. R. Sorenson et al., 1961, page 293, Interscience Publishers, New York, N.Y.); and the polybutadiene resins having primary hydroxyl groups (see Poly Bd. Liquid Resins, Product Bulletin BD-3, October 1974, Arco Chemical Company, Div. of Atlantic Richfield, New York, N.Y.).

A preferred group of polyols comprises the polypropyleneoxy-polyethyleneoxy capped diols and triols obtained by the alkoxylation of water, ammonia, ethylene glycol, propylene glycol, trimethylolpropane, aniline, ethanolamine, and the like; the polyester diols obtained from the reaction of dibasic carboxylic acids such as succinic, adipic, suberic, azelaic, phthalic and isophthalic acids, and the like, with alkylene glycols and oxyalkylene glycols to form the corresponding polyalkylene, and polyoxyalkylene ester diols or copolymers thereof; and the vinyl-resin reinforced propyleneoxy-ethyleneoxy capped diols and triols, particularly those polyethers reinforced with polyacrylonitrile.

Included within the scope of the present invention are those polyamide polyurethane polymers wherein there is present an additional difunctional extender besides the ketene-aminal extender.

The term "difunctional extender" is used in the commonly accepted sense to one skilled in the art and means low molecular weight diols, diamines, aminoalcohols and the like having a molecular weight falling within a range from about 60 to about 400. Preferred as the difunctional extenders are the low molecular weight diols and aromatic diamines.

For typical disclosures relating to diol and aromatic diamine extenders see U.S. Pat. No. 4,169,196 (paragraph bridging columns 5 and 6) and British Pat. No. 1,534,258 (pp 6 and 7) respectively.

A preferred group of extenders includes ethylene glycol, 1,4-butanediol, 1-methyl-3,5-diethyl-2,4-diaminobenzene, 1-methyl-3,5-diethyl-2,6-diaminobenzene, and mixtures of the latter two diamines.

Generally speaking, the proportion of the ketene-aminal to any additional difunctional extender which may be employed is not critical provided the ketene-aminal is present in at least a minor amount. Advantageously, the difunctional extender can be present within a weight range of from about 5 to about 95 percent by weight of the combined weight of ketene-aminal and difunctional extender, preferably from about 5 to about 80 percent by weight. Further, the equivalent proportions of any such difunctional extender are included with the equivalent proportions of ketene-aminal in calculating the range of equivalent proportions of (B) to (C) set forth above.

The relative equivalent proportions of said polyol (B) to said ketene-aminal (C) or combination of ketene-aminal with additional difunctional extender can vary over a wide range depending on specific ingredient molecular weights which in turn controls the degree of so-called "soft and hard segments" and the ultimate properties desired in the polyurethane polymer. Generally speaking, the equivalent proportions of (B) to (C) fall within the range of about 1:4 to about 1:80, preferably about 1:5 to about 1:40, and most preferably about 1:5 to about 1:20.

The terms "soft and hard segments" refer to the linkages derived from the isocyanate component with the polyol (B) and ketene-aminal (C) respectively. Linkages derived from any additional difunctional extender with isocyanate fall into the hard segment category.

The ratio of equivalents of polyisocyanate (A) to the total equivalents of isocyanate reactive ingredients (B) plus (C), inclusive of any additional difunctional extender defined above, falls within a range of from about 0.95:1 to about 6:1, preferably from about 0.95:1 to about 3:1.

Conveniently, the particular ratio of (A) to (B) plus (C) can be easily adjusted to suit the ultimate polymer properties which are desired. Accordingly, when a polyamide polyurethane is desired, the ratio of equivalents of (A) to (B) plus (C) is within the range of about 0.95:1 to about 1.10:1, preferably about 0.95:1 to about 1.05:1.

Alternatively, when a polymer having higher heat resistance is required, the ratio of (A) to (B) plus (C) is at least 1.10:1 and an isocyanate trimerization catalyst (defined below) is present. Accordingly, the ratio of isocyanate equivalents to isocyanate reactive ingredients (B) plus (C) falls within a range of about 1.10:1 to 6:1, preferably 1.10:1 to 3:1.

In an optional, and preferred embodiment in accordance with the present invention, a urethane forming catalyst (D) is present in said polyurethane forming ingredients.

Any of the catalysts conventionally employed in the art to catalyze the reaction of an isocyanate with a reactive hydrogen containing compound can be employed for this purpose; see, for example, Saunders et al., Polyurethanes, Chemistry and Technology, Part I, Interscience, New York, 1963, pages 228–232; see also, Britain et al., J. Applied Polymer Science, 4, 207–211, 1960; see also U.S. Pat. No. 4,218,543 at columns 10 and 11 whose disclosure in respect of urethane catalysts is incorporated by reference herein.

Such catalysts include organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese and zirconium, as well as phosphines and tertiary organic amines. Representative organotin catalysts are stannous octoate, stannous oleate, dibutyltin diacetate, dibutyltin dioctoate, dibutyltin dilaurate, dibutyltin maleate, dibutyltin mercaptopropionate, dibutyltin didodecylmercaptide, dibutyltin bis(isoctylthioglycolate), and the like. Representative tertiary organic amine catalysts are triethylamine, triethylenediamine, N,N,N',N'-tetramethylethylenediamine, N,N,N',N'-tetraethylethylenediamine, N-methylmorpholine, N-ethylmorpholine, N,N,N',N'-tetramethylguanidine, N,N,N',N'-tetramethyl-1,3-butanediamine, N,N-dimethylethanolamine, N,N-diethylethanolamine, N,N-dimethylcyclohexylamine, and the like, and mixtures of the above in any combination.

The preferred catalysts are the organo metallic compounds and particularly the dialkyl tin salts such as the dibutyltin compounds noted above.

The amount of urethane forming catalyst employed can vary considerably according to the particular reactants in the polymer forming mixture and the particular catalyst involved. Optimum catalyst concentration is easily determined using trial and error tests by one skilled in the art. Generally speaking, the catalyst or mixture of catalysts will be employed within a range of from about 0.01 percent by weight to about 5.0 percent by weight preferably from about 0.02 to about 3.0 percent, most preferably from about 0.05 to about 0.5 percent based on the total weight of isocyanate, polyol, and extender.

In the optional embodiment of the present invention described above when the ratio of isocyanate to isocyanate reactive ingredients is at least 1.10 to 1, an isocyanate trimerization catalyst is employed to facilitate the formation of polyisocyanurate linkages in the polyamide polyurethane.

The trimerization catalyst employed can be any catalyst known to those skilled in the art which will catalyze the trimerization of an organic isocyanate compound to form the isocyanurate moiety. For typical catalysts see The Journal of Cellular Plastics, November/December 1975, p 329; U.S. Pat. Nos. 3,745,133; 3,896,052; 3,899,443; 3,903,018; 3,954,684 and 4,101,465 the disclosures of these patents being incorporated herein by reference.

Typical catalyst classes are the glycine salts and alkali metal carboxylic acid salts disclosed in U.S. Pat. No. 4,101,465 cited supra. Preferred species within the classes are sodium N-(2-hydroxy-5-nonylphenyl)methyl-N-methylglycinate, potassium-2-ethylhexanoate and mixtures thereof.

The quantity of trimer catalyst, in parts by weight per equivalent of polyisocyanate, can be determined easily by trial and error for any formulation in accordance with the present invention. Advantageously, the catalyst can be employed within a range of from about 0.1 parts to about 20 parts by weight per equivalent of polyisocyanate, preferably from about 0.5 parts to about 10 parts.

When it is desired to prepare a polyamide polyurethane polyisocyanurate polymer in accordance with the present invention, it is preferable to employ both the urethane catalyst and the trimerization catalyst both within the concentrations set forth above.

The polyamide polyurethane polymers in accordance with the present invention can be prepared using any of the reaction techniques known in the art for the preparation of polyurethane polymers whether by hand mixing or machine mixing techniques. Notably, it is in the molded polyamide polyurethanes, particularly those prepared by the reaction injection molding (RIM) technique wherein the major unexpected benefits of the present polymers are to be found; see U.S. Pat. Nos. 4,218,543 and 4,239,857 for specific teaching on RIM methods for preparing polyurethanes.

However, it will be appreciated by those skilled in the art that the preparation of the instant polyamide polyurethanes is in no way limited to RIM methods of preparation.

In another embodiment the polymers can be prepared in an organic solvent using techniques well known to those skilled in the art. Any organic solvent which dissolves the reactants and does not interact with the components (A) to (D) or otherwise interfere with the course of the polymerization reaction can be employed.

Typical as a class of suitable solvents are the dipolar aprotic solvents such as dimethylformamide, diethylformamide, dimethylacetamide, N-methylpyrrolidone, dimethylsulfoxide, dimethylsulfone, tetramethylenesulfone, tetramethylurea, hexamethylphosphoramide, and the like.

In the event that the reactants which are employed have the requisite functionality to cause a high degree of cross-linking and gelation of the polymer from solution, the polymer solution can be treated accordingly. For example, if the polyamide polyurethane is highly cross-linked it will tend to form a gel in the solvent and, in that case, the solution of the polymer can be cast into a film, foil, or coating just prior to the gelation.

Alternatively, if the polyamide polyurethane is not highly cross-linked it will tend to remain in solution and can be stored as such until an end-use is desired such as making a film, foil, or coating.

In any event, the organic solvent solutions of the present polymers can be cast as films or foils or applied as coatings in solution form on various substrates by dipping, brushing, and the like with subsequent solvent removal.

Optionally, blowing agents may be employed even in the production of molded polyamide polyurethane wherein compact tough skinned surfaces are desired. Any of the organic blowing agents known to those skilled in the art can be used including the fluorocarbon blowing agents. The latter are preferred and generally are halogenated aliphatic hydrocarbons which can be also substituted by chlorine and/or bromine in addition to the fluorine content; see U.S. Pat. No. 3,745,133, column 11, lines 25 to 38 which disclosure relating to fluorocarbon blowing agents is incorporated by reference herein.

Also, inert gases (e.g. nitrogen) may be introduced at the polymer forming stage to provide whatever degree of blowing is desired from micro-cellular to macro-cellular in nature.

Other optional additives such as dispersing agents, cell stabilizers, surfactants, flame retardants, colorants, inert fillers, reinforcing agents, and the like commonly employed in the art can be added to the polyamide polyurethane polymers in accordance with the present invention.

The green strength properties of the present polymers along with the elimination of the need for a cure step enables one to achieve a higher demold rate as well as facilitating the molding of more complicated profiles. That is to say, the molded polyurethane parts can be demolded without the need for prolonged mold residence times without fear of deformation of the part. Obviously, these advantages speed up a production line, cut down on reject rate, and thereby lead to considerable economic advantage.

Accordingly, the molded polyurethane articles in accordance with the present invention are useful for the preparation of solid cast elastomers, solid and microcellular RIM elastomers, and elastoplastics, all within a Shore D hardness range of from about 30 to about 80. The molded products find particular utility as auto parts such as car bumpers, body elements, panels, doors, engine hoods, skirts, air scoops, and the like. Further, the thermosetting nature of the present polymers results in their good high temperature performance characteristics which make them suitable for industrial elastomer applications where high temperature resistance is needed such as in paint drying chambers.

The following examples describe the manner and process of making and using the invention and set forth the best mode contemplated by the inventors of carrying out the invention but are not to be construed as limiting.

EXAMPLE 1

A polyamide polyurethane and a polyamide polyurethane polyisocyanurate respectively in accordance with the present invention were prepared in the form of films which had the properties set forth in Table I. The polymers were prepared as follows.

A 100 ml. resin flask was equipped with a stirrer, thermometer, addition funnel, and a gas in-let tube. The flask was charged with 11.34 g. (0.038 isocyanate equivalent) of an isocyanate terminated polyurethane prepolymer having an isocyanate equivalent weight of about 300. The prepolymer was previously prepared by the reaction of 1800 g. (0.857 hydroxyl eq.) of a 6500 M.W. polypropyleneoxy-polyethyleneoxy triol having a hydroxyl equivalent weight of about 2100 (Thanol® SF-6503 supplied by Texaco Chemical Co., Bellaire, Texas) with 1500 g. (10.42 isocyanate eq.) of a liquid carbodiimide-containing methylenebis(phenyl isocyanate) having an isocyanate equivalent weight of about 144 and containing about 0.056 equivalent of carbodiimide linkage (Isocyanate I).

The prepolymer was dissolved by stirring in 75 ml. of dimethylacetamide (DMAc) for 30 minutes under a positive pressure of argon and at ambient room temperature (about 20° C.).

A 3.66 g. (0.038 eq.) sample of 1,1-bis(N-piperidinyl)ethylene was added dropwise to the above solution during stirring under argon and at room temperature. Stirring was continued for 30 minutes following the completion of the addition. The viscous yellow reaction mixture was cast into a 6"×6"×1/16" steel mold in an oven at 30° C. before the onset of gelation. After 1 hour the temperature was raised to 50° C. and then to 80° C. after another hour.

The resulting yellow flexible film was dried overnight at 80° C. under a vacuum of 0.1 mm of mercury. Thus there was obtained Film 1 which was 0.018" thick and having the properties set forth in Table I.

Film 2 was prepared by using the same procedure and reactants as above except for the additional presence of an isocyanate trimerization catalyst and the use of an excess of the isocyanate-terminated polyurethane prepolymer as follows.

A 17.01 g. (0.057 eq.) sample of the prepolymer was dissolved in the DMAc by stirring under argon at roomtemperature for about 15 minutes. The 3.66 g. of 1,1-bis(N-piperidinyl)ethylene was added dropwise and stirring continued for 1 hour after completion of the addition. Then 0.5 g. of N,N',N"-tris(3-dimethylaminopropyl)hexahydrotriazine (HHT) was added and the reaction solution stirred for 30 minutes.

The reaction mixture was cast into the mold at 30° C. in an oven before gelation and subjected to the following cycle: 30° C. for 30 minutes, 40° C. for 30 minutes, 60° C. overnight (approximately 15 hours), finally 80° C. for 8 hours under 0.1 mm of pressure. The properties of the yellow flexible Film 2 are set forth in Table I.

TABLE I

| Film | 1 | 2 |
|---|---|---|
| Hardness, Shore D[1] | 65 | 73 |
| Tensile str. (psi)[2] | 5555 | 6364 |
| Elongation (%) | 280 | 200 |
| TMA Softening pt. (°C.)[3] | | |
| no post cure | 158 | 156 |
| cured 250° F./1 hr. | 158 | 156 |

Footnotes to Table I
[1]Hardness, Shore D Durometer hardness according to ASTM Test Method D2240.
[2]The tensile strength is determined at break in accordance with ASTM Test D882.
[3]Softening point was determined using thermal mechanical analysis (TMA) using a DuPont 941 Thermal Analyzer in the TMA mode using 50 gm. loading on the penetration probe and a heating rate of 10° C. per minute.

In spite of the mild reaction conditions (ambient temperatures), the reaction between the ketene aminal and the NCO terminated prepolymer proceeded rapidly to completion and provided the Films 1 and 2 exhibiting optimum softening points without the need for a post cure treatment.

EXAMPLE 2

Polyamide polyurethane polymers in accordance with the present invention and a comparison polyurethane (without use of a ketene-aminal) were prepared with the ingredients in the proportions by weight set forth in Table II and cast into the corresponding Films 3 to 6 and comparison film respectively.

The same apparatus and general procedure employed in Example 1 was used in the preparation of the polymers of this example except that the unreacted components of the polyurethane prepolymer of Example 1 (i.e. SF-6503 and Isocyanate I) were employed instead of the prepolymer itself. Also, the Isocyanate I dissolved in about 20 ml DMAc was added dropwise to the resin flask containing the ketene-aminal and SF-6503 dissolved in about 40 ml DMAc and containing 1 drop of the polyurethane catalyst dibutyltin dilaurate. The comparison film was prepared without the use of a catalyst; however, the reaction was run at an elevated temperature (50° C.). The film casting and curing followed the general procedure described previously.

The clear yellow flexible Films 3 to 6 contained extender combinations of 95 percent by weight of the morpholinylethylene to 5 percent of ethylene glycol or the DETDA mixture to 95 percent of glycol or DETDA to 5 percent of the morpholinylethylene. In the comparison film containing only the urethane hard segments (i.e. no amide hard segments) the elongation and/or tensile strength properties are decidedly different from those of Films 3 to 6. Film 6 of the invention, having the high concentration of polyurea linkages had an expected lower elongation than the comparison but was almost twice as strong in tensile strength.

TABLE II

| Film | 3 | 4 | 5 | 6 | Comparison |
|---|---|---|---|---|---|
| Ingredients (pts. by wt.): | | | | | |
| SF-6503[1] | 6.02 | 8.66 | 7.06 | 7.06 | 6.99 |
| | (0.003 eq.) | (0.004 eq.) | (0.0034 eq.) | (0.0034 eq.) | (0.0033 eq.) |
| 1,1-Bis(N-morpholinyl)-ethylene | 0.08 | 2.06 | 2.82 | 0.15 | — |
| | (0.0008 eq.) | (0.021 eq.) | (0.0285 eq.) | (0.0015 eq.) | |
| Isocyanate I[2] | 7.60 | 4.27 | 4.99 | 4.99 | 6.75 |
| | (0.053 eq.) | (0.03 eq.) | (0.034 eq.) | (0.034 eq.) | (0.047 eq.) |
| Dibutyltin dilaurate | 1 drop | 1 drop | 1 drop | 1 drop | — |
| Ethylene glycol | 1.43 | 0.11 | — | — | 1.26 |
| | (0.046 eq.) | (0.004 eq.) | | | (0.041 eq.) |
| DETDA[3] | — | — | 0.13 | 2.54 | — |
| | | | (0.0015 eq.) | (0.0285 eq.) | |
| NCO/Reactant, Index | 1.06 | 1.03 | 1.02 | 1.02 | 1.06 |
| Film properties: | | | | | |
| Hardness, Shore D | 57 | 32 | 45 | 50 | 42 |
| Elongation (%) | 260 | 480 | 350 | 70 | 100 |
| Tensile, psi | 7090 | 1470 | 2690 | 2970 | 1550 |

Footnotes to Table II
[1]SF-6503 is the triol of M.W. 6500 described in Ex. 1.
[2]Isocyanate I is the liquid carbodiimide-containing methylenebis(phenyl isocyanate) described in Ex. 1.
[3]DETDA is an 80/20 weight percent mixture of 1-methyl-3,5-diethyl-2,4-diaminobenzene and 1-methyl-3,5-diethyl-2,6-diaminobenzene.

EXAMPLE 3

Using the apparatus and general procedure described in Example 2, the following 7 films were prepared. Films 7, 8, and 12 were cast from polyamide polyurethane polymers in accordance with the invention. Films 9 through 11 were cast from polyamide polyurethane polyisocyanurate polymers in accordance with the invention and the HHT catalyst was added similarly to Film 2 of Example 1, about 1 hour after completion of the addition of the DMAc solution of isocyanate to the resin flask at room temperature (about 20° C.). In the case of Film 11 the isocyanate was dissolved in 100 ml of DMAc for the addition step. Film 11 because of the very high isocyanurate content tended to be brittle.

The yellow flexible Films 7 to 12 were all easily demolded and shown to have good physical properties. The comparison film which contained the ketene-aminal at a level below that called for by the present invention did not possess sufficient structural integrity to be demolded without suffering distortion.

TABLE III

| Film | Comparison Film | 7 | 8 | 9 | 10 | 11 | 12 |
|---|---|---|---|---|---|---|---|
| Ingredients (pts. by wt.): | | | | | | | |
| SF-6503[1] | 11.14 | 7.06 | 1.43 | 7.06 | 7.06 | 7.06 | 7.06 |
| | (0.0053 eq.) | (0.0034 eq.) | (0.0007 eq.) | (0.0034 eq.) | (0.0034 eq.) | (0.0034 eq.) | (0.0034 eq.) |
| 1,1-Bis(N-morpholinyl)-ethylene | 1.23 | 2.97 | 5.38 | 2.97 | 2.97 | 2.97 | 2.97 |
| | (0.012 eq.) | (0.030 eq.) | (0.054 eq.) | (0.030 eq.) | (0.030 eq.) | (0.030 eq.) | (0.030 eq.) |
| Isocyanate I[2] | 2.63 | 4.97 | 8.19 | 5.49 | 7.62 | 25.42 | — |
| | (0.018 eq.) | (0.034 eq.) | (0.056 eq.) | (0.037 eq.) | (0.051 eq.) | (0.17 eq.) | |
| Isocyanate II[3] | — | — | — | — | — | — | 4.52 |
| | | | | | | | (0.034 eq.) |
| Dibutyltin dilaurate | 1 drop | 1 drop | 1 drop | — | — | — | 1 drop |
| HHT[4] | — | — | — | 0.5 | 0.5 | 0.5 | — |
| NCO/Reactant, Index | 1.04 | 1.02 | 1.02 | 1.1 | 1.5 | 5.0 | 1.02 |
| % Hard Segment | 20% | 50% | 88% | 51% | 57% | 79% | 48% |
| Ratio SF-6503/Extender | 1:2.3 | 1:8.8 | 1:77 | 1:8.8 | 1:8.8 | 1.8:8 | 1.8:8 |
| Film Properties: | | | | | | | |
| Hardness, Shore D | — | 47 | 45–50 | 49 | 63 | — | 47 |
| Elongation (%) | — | — | — | 200 | 220 | — | 170 |

TABLE III-continued

| Film | Comparison Film | 7 | 8 | 9 | 10 | 11 | 12 |
|---|---|---|---|---|---|---|---|
| Tensile, psi | — | — | — | 2810 | 6350 | — | 2040 |

Footnotes to Table III
[1]SF-6503 is the triol of M.W. 6500 described in Example 1.
[2]Isocyanate I is the liquid carbodiimide-containing methylenebis(phenyl isocyanate) described in Example 1.
[3]Isocyanate II is a polymethylene poly(phenyl isocyanate) containing about 40% by wt. methylenebis(phenyl isocyanate) with the remaining 60% comprising polymethylene poly(phenyl isocyanates) of functionality greater than 2; isocyanate eq. wt. = about 133.
[4]The hexahydrotriazine defined in Film 2 Example 1.

EXAMPLE 4

The following polyamide polyurethane Sample 1 in accordance with the present invention and a comparison sample of polyurea polyurethane not so in accordance were prepared using a bench scale reaction injection molding (RIM) machine with the ingredients in the proportions by weight set forth in Table IV.

One tank of the RIM machine was charged with the isocyanate component while the second tank held the remaining ingredients. Metering pumps from each tank were used to deliver the ingredients into the impingement mixing head of the RIM machine. After mixing, the reaction mixture was directed into a metal mold measuring 8"×8"×⅛" at a mold temperature of 140° F. The samples were post cured at 250° F. for 1 hour before being subjected to the test procedures set forth below.

Sample 1 showed superior elongation and tensile properties as compared to the comparison sample.

TABLE IV

| Sample | 1 | Comparison |
|---|---|---|
| Ingredients (pts. by wt.) | | |
| Isocyanate III[1] | 50.26 (0.28 eq.) | 54.87 (0.31 eq.) |
| SF-6503 | 100 (0.05 eq.) | 100 (0.05 eq.) |
| 1,1-Bis(N-morpholinyl)-ethylene | 22 (0.22 eq.) | — |
| DETDA | — | 22 (0.25 eq.) |
| UL-28[2] | 0.05 | 0.05 |
| NCO/Reactant, Index | 1.04 | 1.03 |
| Ratio SF-6503/Extender | 1:4.4 | 1:5.0 |
| Physical properties: | | |
| Hardness, Shore D | 42 | 55 |
| Tensile, psi | 2563 | 2304 |
| Elongation (%) | 400 | 250 |
| Tensile modulus (psi) | | |
| 100% elongation | 845 | 1192 |
| 200% elongation | 1408 | 1792 |
| 300% elongation | 1944 | — |

Footnotes to Table IV
[1]Isocyanate III is a liquid isocyanate prepolymer prepared from 4,4'-methylenebis(phenyl isocyanate) and a mixture of a minor amount of dipropylene and tripropylene glycol, I.E. = 180.
[2]UL-28 is a dimethyl tin dialcoholate supplied by Witco Chem. Corp., Park Ave., New York, N.Y.

EXAMPLE 5

The following polyamide polyurethanes (samples 2 through 7, inclusive) and polyamide polyurethane polyisocyanurate (samples 8 through 12, inclusive) all in accordance with the present invention were prepared using a pilot plant scale RIM machine using the ingredients and proportions by weight set forth in Table V.

One tank of the RIM machine was charged with the isocyanate component while the second tank was charged with the polyol, ketene-aminal, urethane catalyst, and isocyanate trimerization catalyst where appropriate. After mixing, the reaction mixture was directed into a metal step mold measuring 16"×60" by three varying thicknesses of 0.100", 0.150", and 0.180" at a mold temperature of 175°–180° F. at throughput rates of 157 lbs./min. for samples 2 through 7, 151 lbs./min. for samples 8 and 9, 168 lbs./min. for samples 10, 11, and 191 lbs./min. for sample 12. Demold time in all cases was 1 minute.

In view of the rapid gel rates, only the first (0.100") and second (0.150") sections of the step mold were filled, and, because of some pre-gelation in the second section, only the 0.100" section was used for physical property determination.

Samples 2 through 4 are directly comparable to samples 5 through 7, at their corresponding NCO indices. The noteworthy result of the comparison is that while the sample series 5 to 7 received no post cure treatment whatsoever, their physical properties were almost the same as the corresponding properties of the 2 to 4 series which latter did receive the post cure 250° F./1 hr. treatment. That is to say, the use of the ketene-aminal as an extender had the effect of producing the molded pieces having their maximum physical properties at the time of demold. Additionally, the gel times were very fast at 0.9 second and the attainment of these maximum properties so rapidly without the need of a cure step is a very advantageous feature.

The same results were observed when the comparisons were made with the polyamide polyurethane polyisocyanurate samples. Samples 9 and 11, while receiving no post cure, exhibited close to their maximum attainable properties at very rapid gel rates when compared to samples 8 and 10.

Sample 12 showed increased flexural and modulus properties as the polyisocyanurate content increased notwithstanding the very rapid gel rate. The heat sag properties of the polyisocyanurate samples 8 through 12 showed clear superiority over the straight amide/urethane samples 2 to 7 with heat sag properties rapidly improving as the polyisocyanurate content increases.

TABLE V

| Sample | 2 | 3 | 4 | 5 | 6 | 7 | 8 | 9 | 10 | 11 | 12 |
|---|---|---|---|---|---|---|---|---|---|---|---|
| Ingredients (pts. by wt.) | | | | | | | | | | | |
| Isocyanate I | — | — | — | — | — | — | 86.25 | 86.25 | 116.55 | 116.55 | 155.4 |
| Isocyanate III | 73.8 | 77.7 | 81.6 | 73.8 | 77.7 | 81.6 | — | — | — | — | — |
| SF-6503 | 100 | 100 | 100 | 100 | 100 | 100 | 100 | 100 | 100 | 100 | 100 |
| 1,1-Bis(N-morpholinyl)- | 40 | 40 | 40 | 40 | 40 | 40 | 40 | 40 | 40 | 40 | 40 |

TABLE V-continued

| Sample | 2 | 3 | 4 | 5 | 6 | 7 | 8 | 9 | 10 | 11 | 12 |
|---|---|---|---|---|---|---|---|---|---|---|---|
| ethylene | | | | | | | | | | | |
| UL-28 | 0.347 | 0.347 | 0.347 | 0.347 | 0.347 | 0.347 | 0.347 | 0.347 | 0.347 | 0.347 | 0.347 |
| Trimer, caty.[1] | — | — | — | — | — | — | 0.5 | 0.5 | 0.5 | 0.5 | 0.5 |
| NCO Index | 0.95 | 1.00 | 1.05 | 0.95 | 1.00 | 1.05 | 1.11 | 1.11 | 1.50 | 1.50 | 2.0 |
| % Hard Segment | 51.4 | 51.4 | 51.4 | 51.4 | 51.4 | 51.4 | — | — | — | — | — |
| Gel time, sec. | 0.9 | 0.9 | 0.9 | 0.9 | 0.9 | 0.9 | 1.2 | 1.2 | 1.2 | 1.2 | 1.2 |
| Post Cure 250° F./1 hr. | Yes | Yes | Yes | No | No | No | Yes | No | Yes | No | Yes |
| Physical Properties: | | | | | | | | | | | |
| Density, g./cc | 1.122 | 1.127 | 1.126 | 1.138 | 1.128 | 1.128 | 1.119 | 1.122 | 1.138 | 1.134 | 1.132 |
| Hardness, Shore D | 64 | 68 | 69 | 65 | 65 | 66 | 65 | 65 | 75 | 74 | 79 |
| Tensile, psi | 2633 | 2950 | 2908 | 2550 | 2717 | 2800 | 2867 | 2167 | 3350 | 2833 | 4417 |
| Elongation (%) | 280 | 237 | 240 | 297 | 277 | 273 | 150 | 207 | 67 | 97 | 58 |
| Flex. Mod., kpsi | 55.29 | 59.65 | 68.16 | 60.13 | 65.05 | 69.08 | 60.11 | 65.15 | 116.5 | 102.6 | 138.2 |
| Flex. Str., psi | 2367 | 2751 | 3097 | 2435 | 2588 | 2774 | 2759 | 2592 | 4633 | 4209 | 6316 |
| Heat Sag[2] | — | droops | — | — | droops | — | 1.14 | — | 0.53 | — | 0.07 |

Footnotes to Table V
[1]Catalyst is potassium 2-ethylhexanoate 25% by wt. in dipropylene glycol.
[2]Heat sag is determined by measuring the amount, in inches, that a 1 inch wide sample with a 4 inch long unsupported length droops under its own weight when held at one end in a horizontal position for 1 hour at 250° F.

We claim:

1. A polyamide polyurethane which comprises the product of reaction of
   A. an organic polyisocyanate;
   B. at least one organic polyol; and
   C. a ketene-aminal having the formula

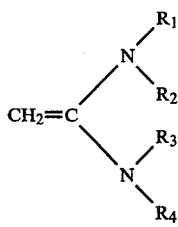

wherein $R_1$, $R_2$, $R_3$, and $R_4$, when taken separately, are independently selected from the group consisting of lower alkyl, aralkyl, and cycloalkyl and, when taken together as $R_1$ with $R_2$ and $R_3$ with $R_4$ with the respective nitrogen atoms to which they are attached, represent independently a heterocyclic group having from 5 to 7 ring atoms
   wherein the equivalent proportions of said polyol component (B) to said ketene-aminal component (C) fall within the range of about 1:4 to about 1:80 and the ratio of equivalents of said isocyanate to total equivalents of isocyanate reactive ingredients (B) plus (C) is within the range of about 0.95:1 to 6:1.

2. A polyamide polyurethane according to claim 1 wherein said polyisocyanate (A) comprises an aromatic polyisocyanate.

3. A polyamide polyurethane according to claim 1 wherein in said ketene-aminal $R_1$ with $R_2$ and $R_3$ with $R_4$ with the respective nitrogen atoms to which they are attached form the same heterocyclic groups having from 5 to 7 ring atoms.

4. A polyamide polyurethane according to claim 3 wherein said ketene-aminal comprises 1,1-bis(N-piperidinyl)ethylene.

5. A polyamide polyurethane according to claim 3 wherein said ketene-aminal comprises 1,1-bis(N-morpholinyl)ethylene.

6. A polyamide polyurethane according to claim 1 wherein the ratio of equivalents of said isocyanate to total equivalents of isocyanate reactive ingredients (B) plus (C) is within the range of about 0.95:1 to 1.10:1.

7. A polyamide polyurethane according to claim 1 wherein the ratio of equivalents of said isocyanate to total equivalents of isocyanate reactive ingredients (B) plus (C) is at least 1.10:1 and an isocyanate trimerization catalyst is present.

8. A polyamide polyurethane according to claim 1 wherein there is also present a difunctional extender having a molecular weight falling within a range of from about 60 to about 400 and the extender is present within a weight range of from about 5 to about 95 percent by weight of the combined weight of ketene-aminal and said extender and that the equivalent proportions of said extender are included with (C) in calculating the range of equivalent proportions of (B) to (C) set forth in claim 1.

9. A polyamide polyurethane according to claim 8 wherein said extender is a diol.

10. A polyamide polyurethane according to claim 8 wherein said extender is an aromatic diamine.

11. A polyamide polyurethane according to claim 1, 2, 3, 4, 5, 6, 7, 8, 9, or 10 wherein said reaction is carried out in an organic solvent.

12. A polyamide polyurethane which comprises the product of reaction of
    A. an aromatic polyisocyanate;
    B. at least one polyol having a molecular weight of from about 1500 to about 8000 and a primary hydroxyl functionality of from about 2 to about 4;
    C. a ketene-aminal as set forth in claim 1 wherein $R_1$ with $R_2$ and $R_3$ with $R_4$ with the respective nitrogen atoms to which they are attached form the same heterocyclic groups having from 5 to 7 ring atoms; and
    D. a urethane catalyst,
    wherein the equivalent proportions of said polyol component (B) to said component (C) fall within the range of about 1:5 to about 1:40 and the ratio of equivalents of said isocyanate to total equivalents of isocyanate reactive ingredients (B) plus (C) is within the range of about 0.95:1 to 3:1.

13. A polyamide polyurethane according to claim 12 wherein said polyisocyanate comprises a carbodiimide-containing methylenebis(phenyl isocyanate) having an isocyanate equivalent weight of about 130 to about 180.

14. A polyamide polyurethane according to claim 12 wherein said polyol (B) comprises a polyoxypropylene-polyoxyethylene triol of molecular weight about 6000.

15. A polyamide polyurethane product according to claim 12 wherein the ratio of equivalents of isocyanate to said polyol (B) plus said component (C) is at least 1.0:1 and an isocyanate trimerization catalyst is present.

16. A polyamide polyurethane according to claim 12 wherein the equivalent proportions of said polyol component (B) to said component (C) fall within the range of about 1:5 to about 1:20.

17. A polyamide polyurethane according to claim 12, 13, 14, 15, or 16 wherein said component (C) is 1,1-bis(N-morpholinyl)ethylene.

18. A polyamide polyurethane according to claim 12 prepared by the reaction injection molding method.

* * * * *

UNITED STATES PATENT OFFICE
CERTIFICATE OF CORRECTION

Patent No. 4,342,841　　　　　Dated August 3, 1982

Inventor(s) Louis M. Alberino and Dale F. Regelman

It is certified that error appears in the above-identified patent and that said Letters Patent are hereby corrected as shown below:

Column 3, line 48 "$\geq$" in two places should read --$\geq$--.
Column 10, line 37 "roomtemperature" should read --room temperature--. Column 12, Table III, Ratio SF-6503/Extender, Films 11 and 12 "1.8:8" should read --1:8.8--.
Column 18, line 2, Claim 15 "1.0:1" should read --1.10:1--.

Signed and Sealed this

Twenty-first Day of December 1982

|SEAL|

*Attest:*

GERALD J. MOSSINGHOFF

*Attesting Officer*　　*Commissioner of Patents and Trademarks*